US005556490A

United States Patent [19]

Tholérus

[11] Patent Number: 5,556,490

[45] Date of Patent: Sep. 17, 1996

[54] INDICATING BINDING TIMES

[75] Inventor: Jan Tholérus, Täby, Sweden

[73] Assignee: Bindomatic AB, Stockholm, Sweden

[21] Appl. No.: 289,798

[22] Filed: Aug. 12, 1994

[30] Foreign Application Priority Data

Aug. 13, 1993 [SE] Sweden ................................ 9302636

[51] Int. Cl.$^6$ .................................................. B32B 31/00

[52] U.S. Cl. ........................... 156/64; 156/352; 156/359; 156/366; 156/378; 364/569; 412/8; 412/12

[58] Field of Search ............................ 156/64, 359, 363, 156/366, 364, 352, 378; 364/477, 557, 569; 412/8, 11, 12, 14, 37

[56] References Cited

U.S. PATENT DOCUMENTS

| | | | |
|---|---|---|---|
| 4,141,100 | 2/1979 | Domroe et al. | 11/1 AD |
| 4,367,116 | 1/1983 | Wiholm | 156/366 |
| 4,678,386 | 9/1987 | Wiholm | 412/8 |
| 4,818,313 | 4/1989 | Sundberg | 156/64 |
| 4,863,332 | 9/1989 | Wiholm et al. | 412/8 X |
| 5,246,325 | 9/1993 | Morishige et al. | 156/359 X |

FOREIGN PATENT DOCUMENTS

| | | | |
|---|---|---|---|
| 404085029 | 3/1992 | Japan | 156/359 |

*Primary Examiner*—David A. Simmons
*Assistant Examiner*—Paul M. Rivard
*Attorney, Agent, or Firm*—Cooper & Dunham LLP

[57] ABSTRACT

A method and an apparatus for indicating suitable binding times for a file or files placed in a file binding apparatus. The suitable binding time is comprised of the time ($t_0$–$t_2$; $t_3$–$t_5$; $t_6$–$t_8$) required to heat the heating plate of the binding apparatus to a predetermined maximum temperature governed by the switch-off temperature (T2) of a thermostat, and the time taken for the heating plate to cool to a similarly predetermined switch-on temperature (T1) of the thermostat, determined by a lower temperature. The suitable binding time is determined by utilizing the switch-off and switch-on temperatures of the thermostat, wherein the thermostat output signal controls an indicating device which indicates the aforesaid suitable binding time.

9 Claims, 1 Drawing Sheet

INDICATING BINDING TIMES

TECHNICAL FIELD

The present invention relates to a method of indicating in file binding apparatus a suitable binding time for the file or files placed in said apparatus, and also to a circuit arrangement for indicating said suitable binding time in file binding apparatus. The circuit arrangement includes a thermostat which functions to detect the temperature of the heating element belonging to the binding apparatus, this thermostat being included in a control circuit which controls the supply of energy to the heating element.

DESCRIPTION OF THE PRIOR ART

Known binding apparatus and binding methods have been used in different ways to calculate binding times and then maintain the heating elements of the binding apparatus at a given temperature during the binding process.

For instance, U.S. Pat. No. 4,367,116 teaches a binding apparatus in which power is supplied continuously to a heating element so as to maintain the element at a desired working temperature. In this case, preset binding times are selected for files of different thicknesses to be bound in the apparatus, by means of different buttons. Although this binding apparatus is easy to handle, it requires considerable energy inputs because it works with a continuous power supply.

DE-C 3 514 201 teaches a binding apparatus with which power is supplied to the heating element intermittently. In this case, there is used a heat detector which detects the temperature of the heating element and binding is commenced when a certain working temperature is reached and continues until a given binding time has passed, this binding time being predetermined by a timing clock, wherewith binding is terminated at the same time as the power supply to the heating element is disconnected. Power is thus supplied to the heating element both while heating the element to the working temperature and during the time taken to effect the actual binding process. Although this reduces energy consumption to some extent in comparison with earlier apparatus, the amount of energy consumed is still unnecessarily high.

SE-C 8700867-8 teaches an apparatus in which the starting temperature of the heating element is taken into consideration, i.e. the fact that the heating element has been used for binding purposes at an earlier stage, and a binding time is calculated with the aid of a microprocessor on the basis of this starting temperature and on the number of sheets to be bound. In this case, the heating element is supplied with power constantly during the whole of the binding time, which is varied by the microprocessor. Although this apparatus reduces energy consumption considerably in comparison with earlier inventions, the energy consumption is still too high, and the apparatus also uses relatively expensive and complicated electronics.

None of these apparatus and methods includes the possibility of indicating to the user a suitable binding time for the file or files placed in the binding apparatus for binding purposes.

Admittedly, U.S. Pat. No. 4,141,100 teaches an apparatus whereby some idea of a suitable binding time can be obtained with the aid of a keypad or button bank, but in addition to being manual this apparatus is relatively unreliable in operation because of its relatively complicated circuitry.

The object of the present invention is to provide a method and an apparatus by means of which a suitable binding time for the file or files concerned can be predicted effectively. Another object of the invention is to make this prediction automatically with the aid of an inexpensive and simple control electronic means while drastically reducing the energy consumption in the subsequent binding process at the same time. The present invention thus relates to a method and to an apparatus for indicating suitable binding times for the file or files to be bound. These objects are achieved generally with the aid of a method which is characterized in that the suitable binding time is comprised of the time required to heat the heating plate to a predetermined maximum temperature, which is governed by the switch-off temperature of the thermostat, and the time taken for the plate to cool to a similarly predetermined lower temperature level, which is governed by the thermostat switch-on temperature. The aforesaid binding time is therewith determined by utilizing the switch-on and switch-off temperatures of the thermostat, wherein the thermostat output signal controls an indicating device.

The method is realized with the aid of an inventive circuit arrangement which is characterized by an indicating device that can be activated by a relay unit which is included in a control circuit and which is controlled by a thermostat in a manner to define said suitable binding time, which is comprised of the time taken to reach a maximum heating plate temperature, governed by the thermostat switch-off temperature, and the time taken to reach a lower temperature level constituting the thermostat switch-on temperature.

The thermostat is conveniently arranged to control the indicating device so as to indicate said suitable binding time in dependence on the file or files inserted into the apparatus and in dependence on the heating and cooling characteristics of the heating plate, during which time the thermostat also functions to disconnect the supply of energy to the heating plate when said maximum temperature is reached.

BRIEF DESCRIPTION OF THE DRAWINGS

The invention will now be described in more detail with reference to the accompanying drawing, in which.

DESCRIPTION OF THE PREFERRED EMBODIMENT

Figure 1:
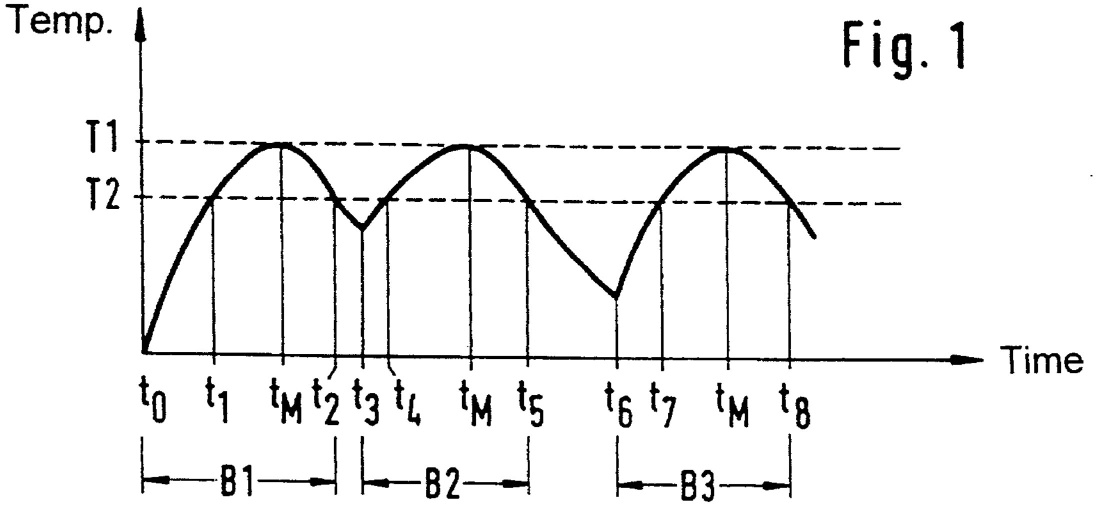
FIG. 1 shows the temperature of the heating element as a function of time when practicing the inventive method.
Figure 2:
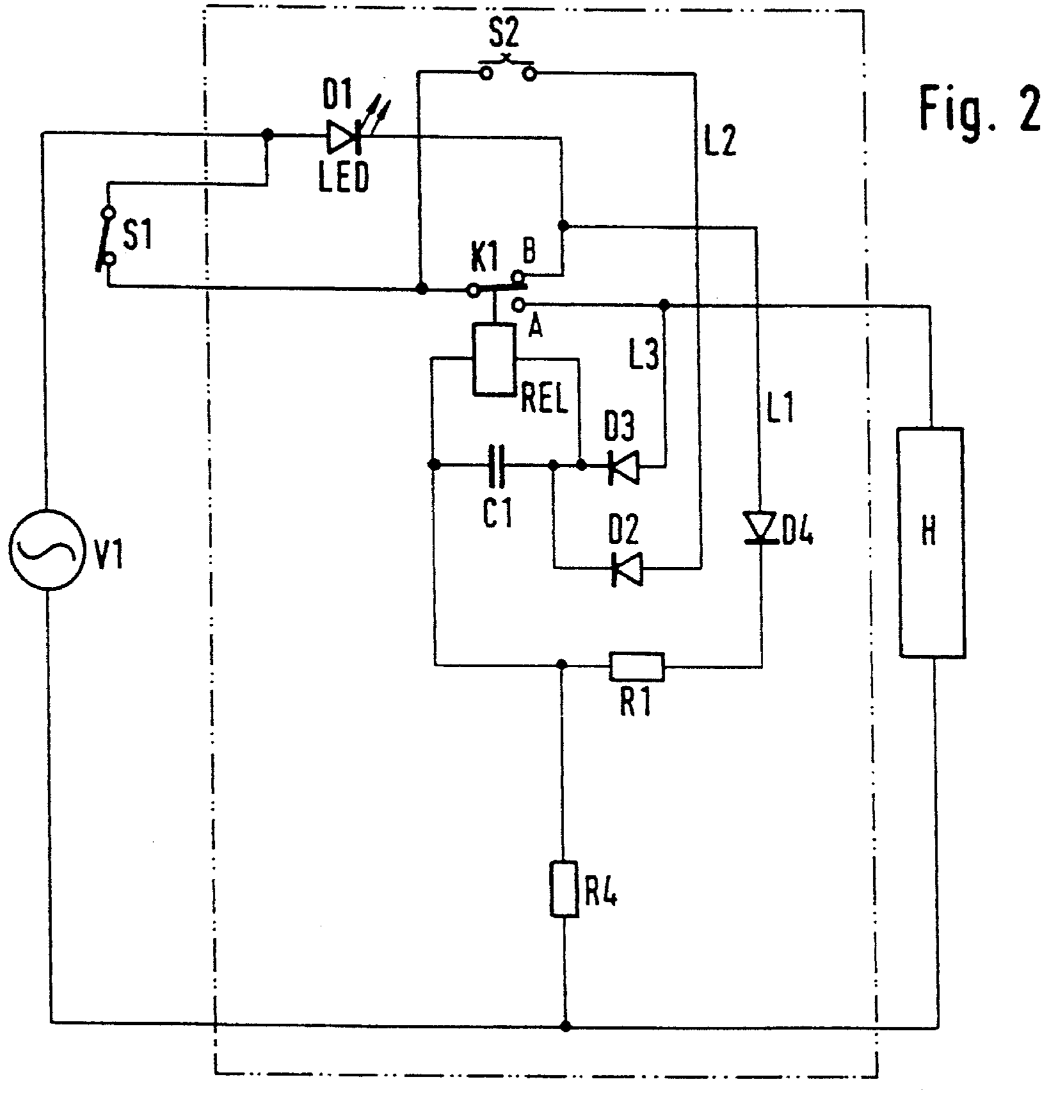
FIG. 2 illustrates a preferred exemplifying embodiment of the inventive apparatus.

FIGS. 1 and 2 illustrate a preferred exemplifying embodiment of the invention. It will be understood, however, that the illustrated and described embodiment merely represents an example of how the invention can be realized and that the invention is restricted solely by the scope of the following claims.

FIG. 1 is a graph which shows the temperature of a heating element as a function of time when applying the inventive method. At time $t_0$, when the temperature of the heating element of the binding apparatus is zero or equal to room temperature, a file to be bound is placed in the binding apparatus and a first binding process B1 is commenced. The heating element of the binding apparatus is then heated until the element reaches a temperature T1. At this time point $t_M$, a thermostat disconnects the supply of energy to the heating element. Binding then continues while the heating element cools down to the temperature T2, at which time point $t_2$ binding of the first file is complete. The effective binding time thus comprises the time period $t_1$–$t_2$. The thermostat again switches on at time point $t_2$, because the temperature of the heating element is now T2, although no binding can take place because no other file has been placed in the apparatus for binding purposes. The temperature of the heating element falls beneath T2 and continues to fall until a further file is placed in the apparatus, so that a further binding process can be carried out. When this file is in position, for instance at time point $t_3$, a new binding process B2 is commenced and the heating element is again heated to the maximum temperature T1. The effective binding of this further file can be said to take place during the time period $t_4$–$t_5$ and is completed in the same manner as that described above. FIG. 1 shows that a third file can be bound after a slightly longer time lapse, the binding process or binding sequence B3. Because of the varying temperature of the heating element, the time taken to heat the element will vary and the files will be present in the binding apparatus for different lengths of time.

FIG. 2 illustrates a circuit arrangement which exemplifies how the method according to FIG. 1 can be realized. The positive output terminal of a voltage source V1 is connected by a conductor to a heating element H, via en thermostat S1 and a relay controlled switch K1, wherein the thermostat S1 is intended to detect the temperature (not shown) of the heating element H and the switch K1 switches between two positions: contact A for supplying power to the heating element H and contact B having a first coupling branch L1. The positive output terminal of the voltage source V1 is also coupled to the first coupling branch L1 which includes the contact B, via an indicating device D1 which is provided with a resistor and which may be a light emitting diode. The first coupling branch L1, which includes the contact B, is comprised of a diode D4 and a resistor R1 and is connected on one side to the indicating device D1 and the switch K1 and on the other side to the first input terminal of a switch controlling relay REL. The input of the switch K1 is also connected to the second input terminal of the relay REL via a second branch L2 which includes a start-up means S2, which may be a push button, and a diode D2. A third coupling branch L3 extends between the conductor of the heating element H and the second input terminal of the relay REL, this third branch L3 including a diode D3. A capacitor C1 is connected between the two input terminals of the relay REL. The first input terminal of the relay REL is finally connected to the negative input terminal of the voltage source V1 and the off-conductor of the heating element H, via a resistor R4.

The circuit operates as follows: When a voltage source V1, which may be an alternating voltage source, is activated but no file has been placed in the apparatus, the thermostat S1 is in a current supply state, but the switch K1 is set for contact with the first coupling branch L1 that includes the contact B. Current will then pass through the thermostat S1 but not through the indicating device D1, since the device includes a resistor. Current will also pass through the switch K1, through the diode D4 and through the resistors R1 and R4. No current passes through the heating element H.

When a file is placed in the apparatus for binding purposes, the start-up means S2 is activated, i.e. the button is pressed, and current will pass through the second coupling branch and through the relay REL, from the second input terminal to the first input terminal, this flow of current through the relay REL causing the switch K1 to switch to the position of contact A for supplying power to the heating element H. The supply of power to the heating element H is therewith commenced.

When the heating element H has been heated to a given temperature T1 according to FIG. 1, the thermostat S1 switches-off and no current will pass from the voltage source V1 to the heating element H or to the relay REL. Instead, current passes through the indicating device D1, the first branch L1 and the resistor R4, back to the voltage source V1. When the heating element H has cooled to the temperature T2 according to FIG. 1, the thermostat S1 switches-on to supply power to the heating element H. No power is supplied, however, since a renewed start of the energy supply to the heating element H requires renewed activation of the start device S2. On the other hand, switching of the thermostat S1 at the temperature T2 causes the indicating device D1 to be made inactive.

The diodes D2, D3 and D4 are halfwave rectifiers and are included in the apparatus for the purpose of stabilizing the relay REL when the voltage D1 is an alternating voltage source.

The circuit arrangement described with reference to FIG. 2 can be modified in several ways with no negative effect on the inventive method. The person skilled in this field will be able to readily perceive those modifications that can be made on the basis of the described preferred embodiment. For instance, the relay REL can be replaced with a transistor or transistor circuit.

In the preferred embodiment, the start-up means S2 has the form of a button which is pressed when a file to be bound is present in the apparatus. This button can be replaced, however, with a photo-detector means which detects when a file is present in the apparatus. Similarly, although the indicating device D1 of the preferred embodiment has the form of light emitting diodes, these diodes can be replaced with a suitable display or with some other suitable means of indicating a suitable binding time for the file or files placed in the binding apparatus for binding purposes. Although the heat detecting device S1 of the preferred embodiment has the form of a thermostat, it will be understood that other technically equivalent elements, such a thermistor for instance, can be used instead.

We claim:

1. A method for indicating in file binding apparatus a binding time for at least one file placed on a heating element therein, the apparatus including thermostat means adapted for switching on at a first predetermined temperature and switching off at a second predetermined temperature higher than the first predetermined temperature, and indicating means controlled by an output signal from the thermostat means, comprising the steps of determining a binding time based on the time required to heat the heating element to the second predetermined temperature and the time it takes for the heating element to cool from the second predetermined temperature to the first predetermined temperature, and indicating the determined binding time by the indicating means.

2. A method according to claim 1, further comprising the step of determining the heating and cooling times of the heating element based on the difference between the first and second predetermined temperatures.

3. A binding apparatus which indicates a binding time for at least one file placed on a heating element in the apparatus, comprising a control circuit for controlling a supply of energy to the heating element, a thermostat in the control circuit for detecting the temperature of the heating element, the thermostat being adapted for switching on at a first predetermined temperature and switching off at a second predetermined temperature higher than the first predetermined temperature, relay means controlled by the thermostat for determining the binding time based on the time it takes to heat the heating element to the second predetermined temperature and the time it takes for the heating element to cool to the first predetermined temperature, and indicating means activated by the relay means for indicating the binding time.

4. Apparatus according to claim 3, wherein the thermostat comprises output means for deactivating the indicating means to indicate the binding time based on the existence of a file in the binding apparatus and the first and second predetermined temperatures, and for disconnecting the energy supply from the heating element.

5. Apparatus according to claim 3, further comprising start-up means for controlling the supply of energy to the heating element.

6. Apparatus according to claim 5, wherein the start-up means comprises output means for activating the relay means, whereby upon activation of the start-up means, the relay means activates to connect the energy supply to the heating element, and wherein the thermostat disconnects the energy supply from the heating element when the heating element reaches the second predetermined temperature and deactivates the relay when the heating element cools to the first predetermined temperature.

7. Apparatus according to claim 5, wherein the start-up means is a push button.

8. Apparatus according to claim 5, wherein the start-up means comprises photo-detection means activated upon detection of a file in the apparatus.

9. Apparatus according to claim 3, wherein the indicating device comprises at least one light emitting diode.

* * * * *